(12) United States Patent
Golinski et al.

(10) Patent No.: US 8,132,371 B2
(45) Date of Patent: Mar. 13, 2012

(54) MODULAR FURNITURE SYSTEM

(75) Inventors: Stefan Golinski, Paris (FR); Piero Lissoni, Milan (IT); Mark Krusin, Milan (IT)

(73) Assignee: Knoll International, S.p.A., Milan (IT)

( * ) Notice: Subject to any disclaimer, the term of this patent is extended or adjusted under 35 U.S.C. 154(b) by 541 days.

(21) Appl. No.: 12/296,711

(22) PCT Filed: Apr. 13, 2007

(86) PCT No.: PCT/EP2007/053650
§ 371 (c)(1),
(2), (4) Date: May 7, 2009

(87) PCT Pub. No.: WO2007/118864
PCT Pub. Date: Oct. 25, 2007

(65) Prior Publication Data
US 2009/0206716 A1 Aug. 20, 2009

Related U.S. Application Data

(60) Provisional application No. 60/792,061, filed on Apr. 14, 2006.

(51) Int. Cl.
*A47B 97/00* (2006.01)
*E04B 1/38* (2006.01)
(52) U.S. Cl. ............ 52/36.5; 52/582.2; 108/64
(58) Field of Classification Search .......... 52/36.4–36.6, 52/586.2, 582.2; 108/64, 65; 403/329, 397, 403/DIG. 14
See application file for complete search history.

(56) References Cited

U.S. PATENT DOCUMENTS

| | | | | |
|---|---|---|---|---|
| 2,096,319 A | * | 10/1937 | Churchill | 248/27.3 |
| 2,501,940 A | * | 3/1950 | Hibbard | 16/425 |
| 2,516,907 A | * | 8/1950 | Penfold | 285/7 |
| 2,824,315 A | * | 2/1958 | McKenny | 114/367 |
| 2,879,561 A | * | 3/1959 | Rieder | 403/329 |
| 3,639,950 A | * | 2/1972 | Lutz et al. | 24/615 |
| 4,245,879 A | * | 1/1981 | Buck | 439/345 |
| 4,530,136 A | * | 7/1985 | Konkle | 24/608 |
| 4,643,610 A | * | 2/1987 | Bien | 403/326 |
| 4,664,548 A | * | 5/1987 | Brinkmann | 403/14 |

(Continued)

FOREIGN PATENT DOCUMENTS

DE 44 37 228 4/1996

(Continued)

OTHER PUBLICATIONS

International Search Report, PCT/EP2007/053650, International Filing Date Apr. 13, 2007.

*Primary Examiner* — Robert Canfield
(74) *Attorney, Agent, or Firm* — Buchanan Ingersoll & Rooney P.C.

(57) ABSTRACT

A connector connecting different components of furniture is disclosed. The connector has a frame and an insert connected to the frame. The insert has a body, at least one prong attached to the body and at least one release mechanism attached to the body. The one or more prongs are sized and configured to fit within one or more recesses in at least one component of furniture. The one or more release mechanisms are attached to the body so that actuation of one or more of the release mechanisms causes one or more prongs to move.

23 Claims, 18 Drawing Sheets

U.S. PATENT DOCUMENTS

| | | | | |
|---|---|---|---|---|
| 4,752,150 A | * | 6/1988 | Salice | 403/330 |
| 4,930,931 A | * | 6/1990 | Matsui | 403/231 |
| 5,493,831 A | * | 2/1996 | Jansson | 52/235 |
| 5,575,516 A | * | 11/1996 | Baumgarten | 292/353 |
| 5,577,779 A | * | 11/1996 | Dangel | 292/80 |
| 5,947,628 A | * | 9/1999 | Hansen | 403/329 |
| 6,042,157 A | * | 3/2000 | Shimotsu | 292/83 |
| 6,389,759 B2 | * | 5/2002 | McGrath et al. | 52/127.1 |
| 7,144,181 B2 | * | 12/2006 | Areh et al. | 403/109.3 |
| 7,661,233 B2 | * | 2/2010 | Stenvall | 52/466 |
| 2002/0023391 A1 | * | 2/2002 | Nymark | 52/36.4 |
| 2006/0102056 A1 | * | 5/2006 | Wolfe | 108/65 |

FOREIGN PATENT DOCUMENTS

| | | |
|---|---|---|
| EP | 0 940 588 | 9/1999 |
| EP | 1 008 315 | 6/2000 |
| WO | WO 2005/018383 | 3/2005 |

\* cited by examiner

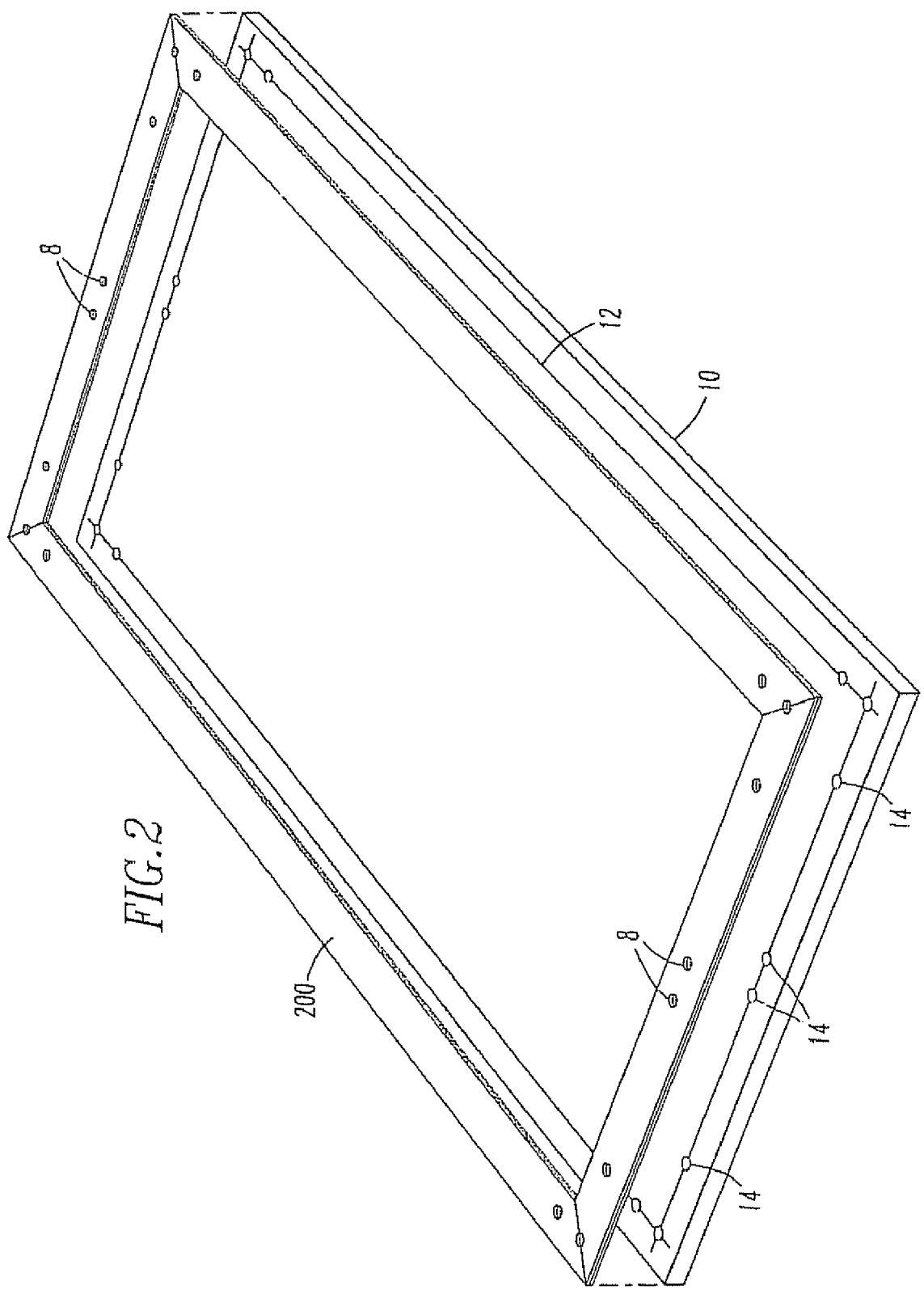

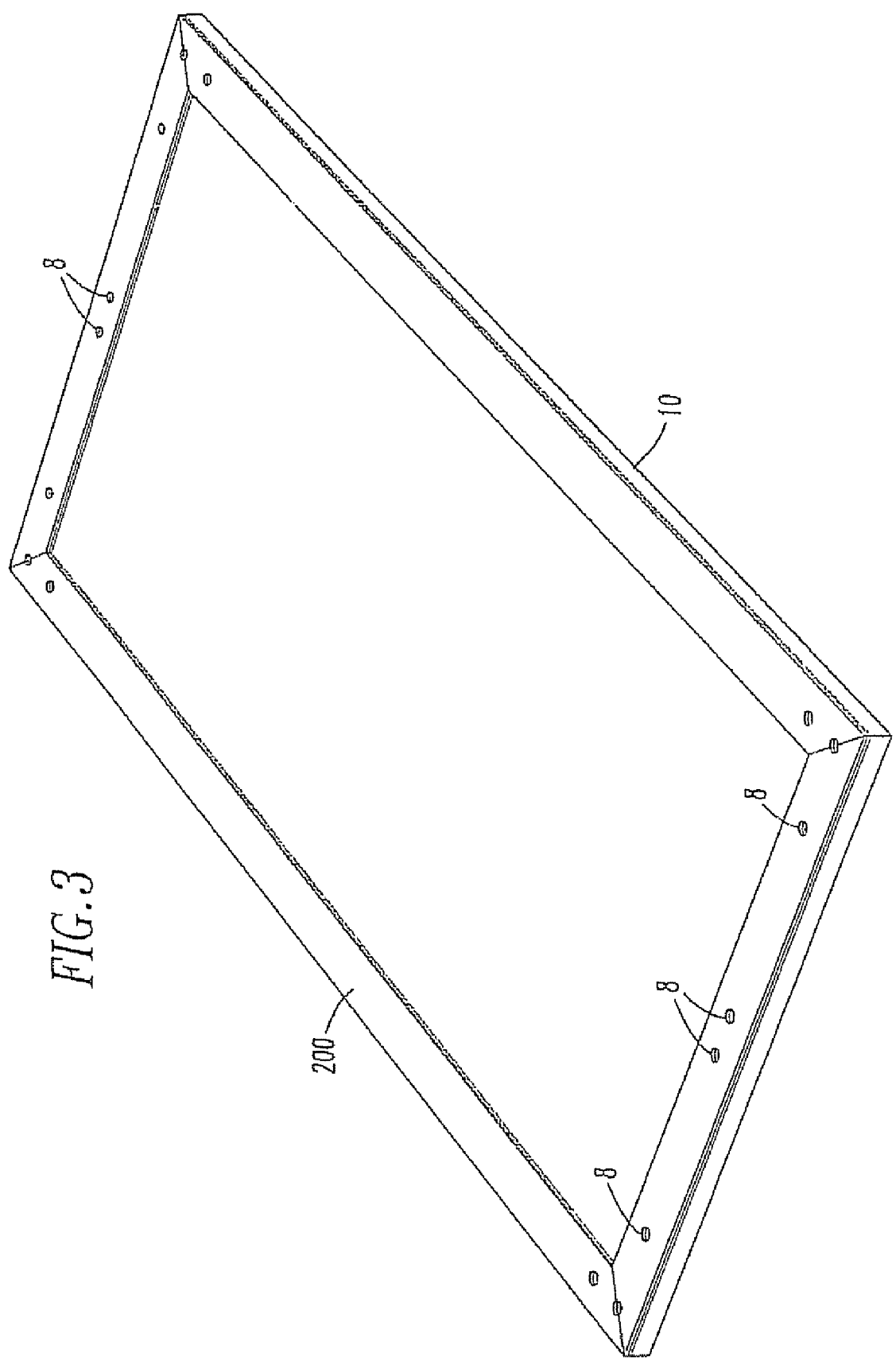

MODULAR FURNITURE SYSTEM

CROSS-REFERENCE TO RELATED APPLICATIONS

The present application claims the benefit under 35 U.S.C. §120 of pending PCT International Application No. PCT/EP2007/053650, which claims the benefit under 35 U.S.C. §119(e) of U.S. Provisional Patent Application Ser. No. 60/792,061 which was filed on Apr. 14, 2006.

FIELD OF INVENTION

The present invention relates to modular furniture systems.

BACKGROUND OF THE INVENTION

In furniture production, it is often desirable to provide customers with furniture that a customer or installer can build from a furniture system made of various component parts. Such modular furniture systems permit customers or installers to purchase the furniture system at a lower cost than purchasing a fully assembled article of furniture or articles of furniture because the customer need not pay a manufacturer or designer the costs associated with fully assembling the various component parts of the furniture Examples of various types of modular furniture systems are disclosed in U.S. Pat. No. 6,877,824 to Winkless, U.S. Pat. No. 6,808,334 to Nicoletti, U.S. Pat. No. 6,883,878 to Gorelick, U.S. Pat. No. 7,014,267 to Nagar, and British Patent GB 2,337,557 to Mainiero.

Some modular furniture systems use similar component parts to construct one type of furniture. For example, Nagar discloses a system that utilizes a plurality of elongate bars and connectors for connecting the bars to one another to construct storage boxes. Mainiero discloses a connector system used to connect multiple screens or panels together. The connector system of Mainiero discloses connectors that have lugs with cup portions that fit within slots within adjacent screens or panels.

Other modular furniture systems are used to make various types of furniture from a set of parts. For instance, Nicoletti discloses a connecting system for modular furniture structures that includes carrier upright elements to which complementary structural members are attached. The structural members are attached to the carrier upright element by connecting means, which include anchors and pin rods attached to the carrier upright element and the structural members.

Such modular systems typically fail to provide a user or installer a way of easily altering the structure of the built furniture to address new furniture needs that may arise For example, many of these systems normally do not provide furniture that has easily rearranged or replaced components.

A modular furniture system is needed that permits purchasers of such systems to easily rearrange furniture built from the components of the system to meet new furniture needs that may arise.

SUMMARY OF THE INVENTION

We provide a connector for connecting furniture components together or furniture components to other devices, such as mouse pads, or storage devices. The connector has a frame and an insert connected to the frame. The insert has a body, at least one prong attached to the body and at least one release mechanism attached to the body. The one or more prongs are sized and configured to fit within a recess in at least one component of furniture. The one or more release mechanisms and one or more prongs are attached to the body such that actuation of the at least one mechanism causes the one or more prongs to move.

It should be understood that the fame and insert may be a unitary structure. The insert can be made of a resilient material. For example, the insert can be made from plastic, elastic, metal or any combination thereof. The flame or insert can also have at least one aperture. The aperture may be sized to receive at least a part of a bolt, bracket or other device.

In one embodiment, the one or more release mechanisms and one or more prongs may extend from the top of the body. In another embodiment, the one or more release mechanisms and one or more prongs may extend from the bottom of the body.

In some embodiments, the one or more release mechanisms can include a first protrusion attached to the body such that movement of the first protrusion causes the one or more prongs to move. A force applied to the first protrusion can actuate the protrusion and cause the one or more prongs to move. In one embodiment, the at least one prong can include a first prong connected to the body adjacent a first side of the first protrusion and a second prong attached to the body adjacent a second side of the first protrusion.

In other embodiments the frame can include a first portion attached to a second portion. A first projection can be attached to the first portion of the frame and a second projection may be attached to the second portion of the frame. The first projection extends from the frame toward the second projection and the second prong extends from the frame toward the first projection The first and second projections are sized and configured to releasably retain a component of furniture. In some of these embodiments, the second portion of the frame can be attached to the first portion of the frame so the second portion is perpendicular to the first portion We also provide a modular furniture system that includes at least one component of furniture and at least one connector. The one or more component of furniture has one or more slots and one or more recesses adjacent the slot or slots. The one or more connectors have a body, at least one release mechanism attached to the body and at least one prong attached to the body. The one or more prongs are sized and configured to fit within the one or more recesses and the at least one release mechanisms is attached to the body so that actuation of the at least one release mechanism causes one or more of the prongs to move. The one or more prongs are positionable within the recess or recesses of the one or more furniture components, which connects the connector to each furniture component When the one or more release mechanisms are actuated, the one or more prongs positioned within one or more recess will move away from the recess so the connector can be separated from one or more components of furniture.

The one or more components of furniture can include light and technical panels, storage devices, pen and paper holders, work surfaces, cable trays and other structures.

In some embodiments, the one or more components can include a structure attached to one or more rails such that at least one slot is formed between the structure and the rail or rails. The rail or rails have at least one groove that defines the at least one recess adjacent the at least one slot The one or more rails can be made from metal, wood, plastic or a combination thereof.

In one embodiment, the one or more rails include a first rail, a second rail, and a rail connector that has a first end connected to the first rail and a second end connected to the second rail. The rail connector can help cover any sharp edges that would otherwise be exposed when the rails are connected to the structure. Preferably, the one or more rails are attached adjacent the perimeter of the structure.

In another embodiment, the one or more rails can have an interior side and an exterior side that are sized and configured so that the at least one slot includes a first slot adjacent the interior side of the rail and a second slot adjacent the exterior side of the rail. The interior and exterior sides of the rail may each have one or more grooves to define the one or more recesses adjacent the one or more slots.

It should be understood that the one or more connectors includes a plurality of connectors and the one or more components of furniture include a plurality of components.

In some embodiments, the system can also include at least one article of furniture comprised of a plurality of components that are connected to each other by at least one connector. In other embodiments, the system can further include one or more devices configured to be connected to the one or more components. The devices have a body attached to one or more fasteners The fasteners have one or more release mechanisms and one or more prongs sized and configured to fit within the one or more recesses of the components. It should be appreciated the release mechanisms and prongs of the fastener or fastener can be sized and configured similarly to the one or more connectors discussed above. The one or more devices can include, but are not limited to, panels, screens, pen and paper holders, storage devices and cable trays.

It should be appreciated that some embodiments of the connector can be configured so that actuation of the one or more release mechanisms can cause the one or more prongs to move away from the one or more recesses in the component of furniture in a direction that is substantially transverse to the recesses. The at least one prong can then be removed from the at least one recess and the at least one slot by moving the at least one connector in a direction substantially transverse to the at least one slot.

Other details, objects, and advantages of the invention will become apparent as the following description of certain present preferred embodiments thereof and certain present preferred methods of practicing the same proceeds.

BRIEF DESCRIPTION OF THE DRAWINGS

In the accompanying drawings we have shown certain present preferred embodiments of our modular furniture system

FIG. 2 is an exploded view of the bottom of the first embodiment.

FIG. 3 is a perspective view of the bottom of the first embodiment.

DETAILED DESCRIPTION OF THE PRESENT PREFERRED EMBODIMENTS

Figure 1:
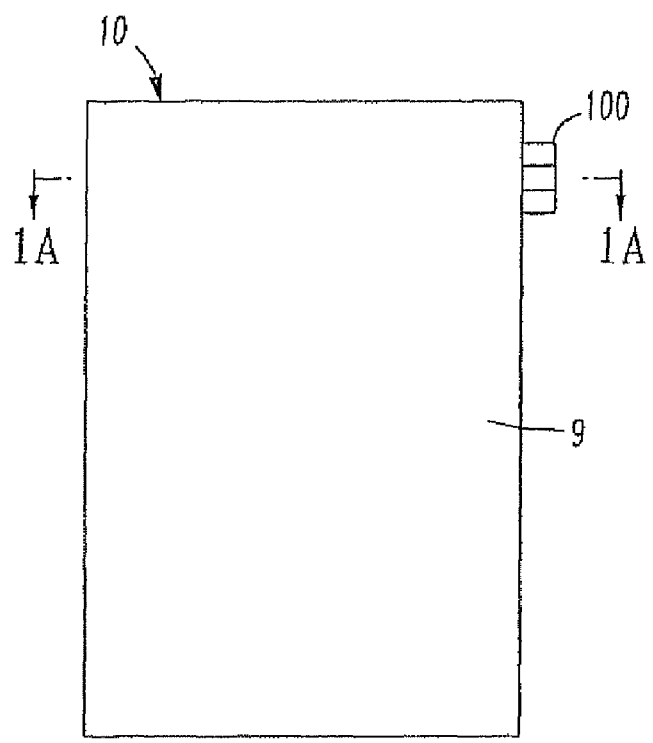
FIG. 1 is a top view of a first embodiment of the present invention

Referring to FIG. 1, one embodiment of the present invention can have a table 10 that is configured to permit connectors 100 to connect various components of furniture adjacent to the work surface 9 of the table 10. It should be appreciated that the different components of furniture can include, but are not limited to, structures providing additional work surfaces, privacy panels, storage devices such as technical panels for housing electrical and data cables and other equipment, mouse pads and other accessories that may be attached to furniture to improve the functionality of the furniture or work place the furniture is designed to provide.

Figure 1A:
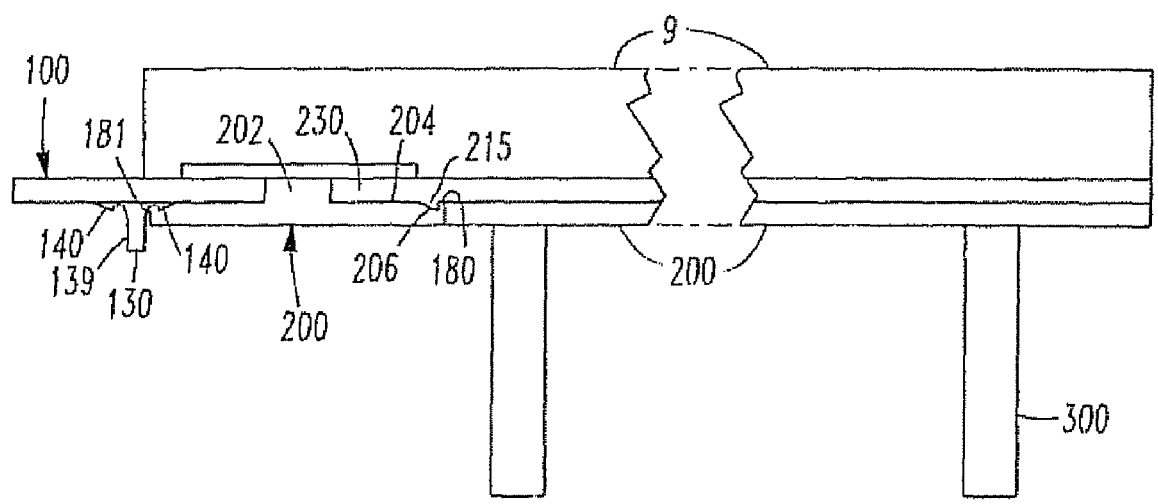
FIG. 1A is a sectional view of the first embodiment taken along line A-A in FIG. 1 that shows the prong of the connector received within a recess defined by the a rail attached below a work surface.
Figure 4:
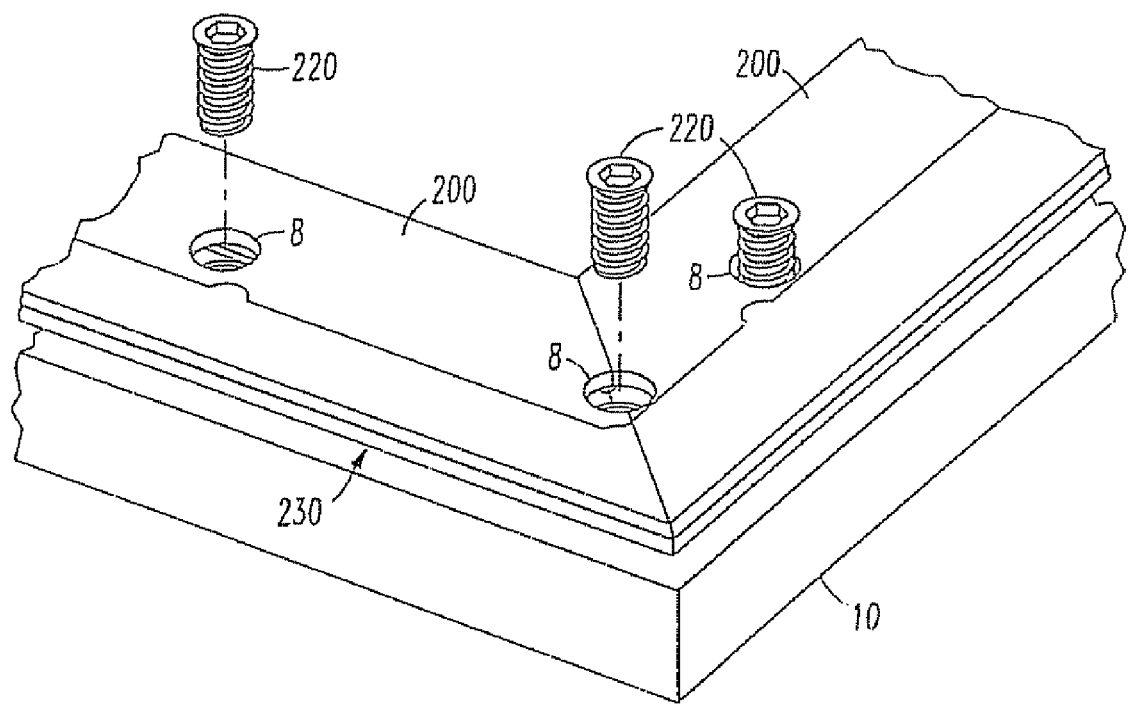
FIG. 4 is an enlarged fragmentary view of a portion of the bottom of the first embodiment.

Rail 200, as best illustrated in FIG. 1A, FIG. 2 and FIG. 3, can be connected to the underside of the work surface 9 adjacent the perimeter of the work surface. The rail 200 and work surface 9 are connected such that slots 230 are formed between the underside of work surface 9 and flat area 204 of rail 200 adjacent the interior side 180 of the rail and the exterior side 181 of the rail. The slots 230 are sized and configured for receiving connectors 100 when they are inserted into the slot The rails 200 have one or more grooves 215 that define recesses 206 adjacent the slot 230 when the rails are connected to an underside portion of table 10. At least one prong 140 on connector 100 fits into recess 206 to hold the connector 100 in slot 230.

The connector 100 can be connected to the work surface 9 such that the connector can slide along slot 230 and recess 206 In some embodiments, one continuous groove 215 can extend along the rail to define one recess adjacent each slot 230. In other embodiments, variously spaced apart grooves can be located in the rail so that multiple grooves define multiple recesses adjacent each slot 230. Such multiple recesses can be used to limit the movement of connectors 100 along the slot 230 Of course, the rail may also be configured with channels that are sized or configured to receive other fasteners or connecting devices adjacent the slot 230

The rail 200 can be formed by an extrusion process and is preferably composed of aluminum. The rail can also be composed of other metals, plastics, ceramics, composites or wood. It should be appreciated that the rail 200 can be considered a component of furniture to which it is attached. Similarly, the portion of furniture to which the rail is attached can be considered a component of furniture.

FIG. 2 shows the underside of work surface 9 having slot 12 and holes 14 predefined therein for the connection of rail 200 to the underside of the work surface. Rail 200 contains projection 202, as shown in FIG. 1A, which fits into slot 12 on the underside of the work surface. The rail may be secured within slot 12 by an adhesive In one alternative embodiment, the rail may be secured to the underside of the work surface 9 by screws, nails, or other fastening devices.

In another alternative embodiment, the slot 12 can be sized and configured to receive and hold the projection 202 of the rail. For such embodiments, the slot 12 may be resilient and able to deform to receive the projection 202. Once the projection is received within the slot 12, the memory of the resilient material defining the receiving portion of the slot 12 may cause the slot to retain the projection 202.

A series of bolts 220 or other fastener devices may also be utilized to further secure rail 200 to the table 10. For example, bolts 220 can be inserted into holes 8 defined in rail 200 that coincide with holes 14 in the underside of work surface 10. Bolts 220 can have a threaded exterior surface for insertion into a wooden work surface or a work surface composed of any other soft material. The interior surface of bolts 220 may also be threaded for the acceptance of machine screws which may be utilized to hold legs 300 or other furniture components to the underside of the table.

Figure 5:
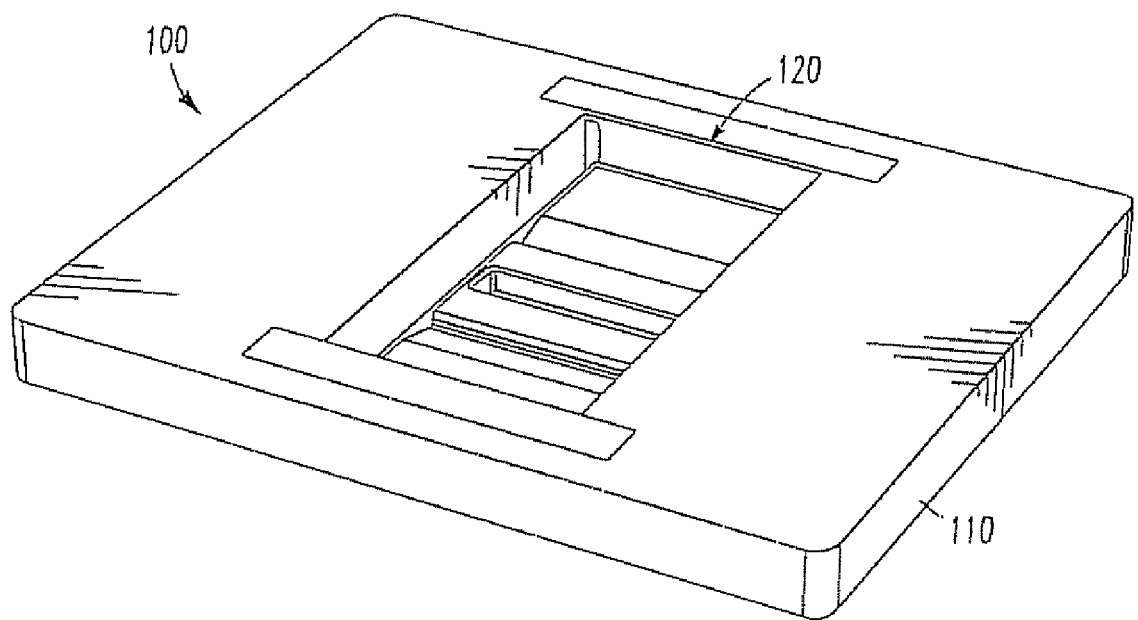
FIG. 5 is a perspective view of the top of a second embodiment of the present invention that illustrates the top of the second embodiment.
Figure 6:
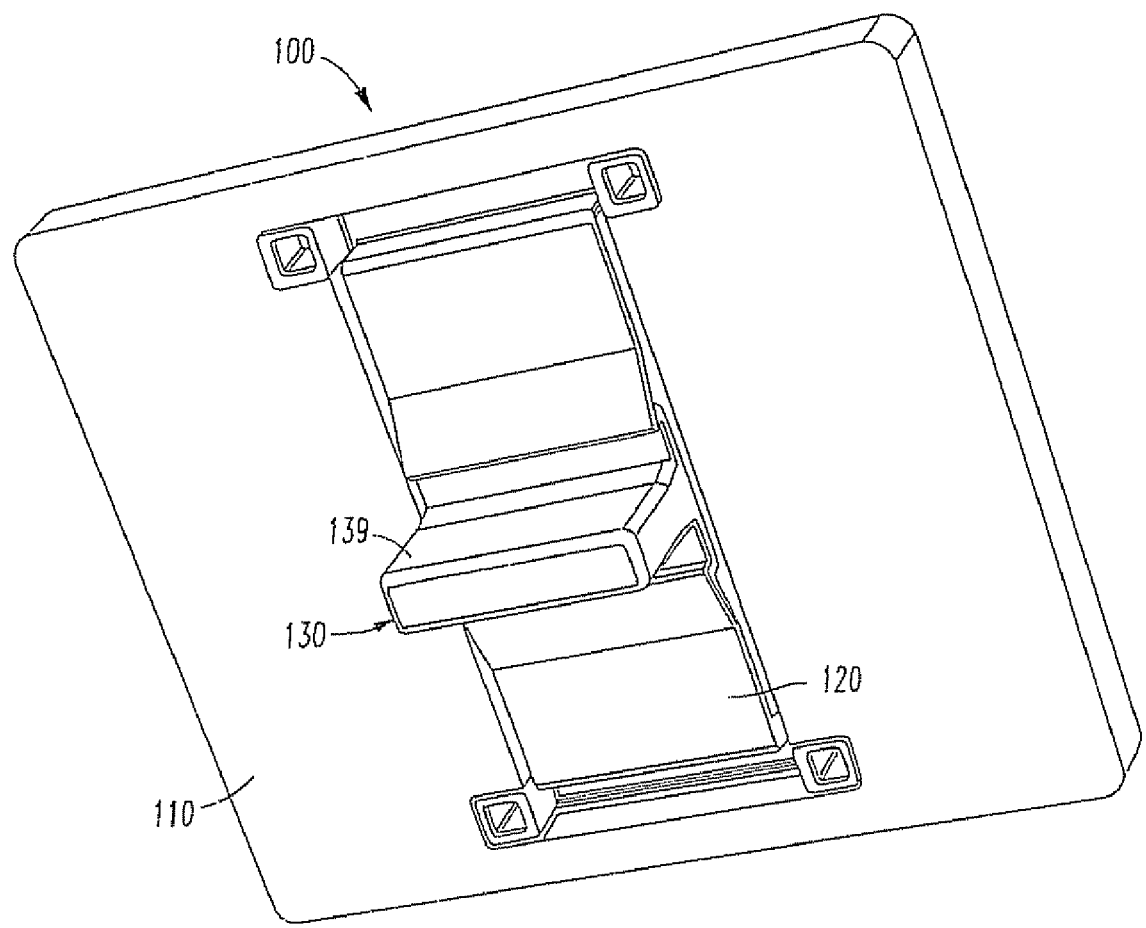
FIG. 6 is perspective view of the second embodiment, which illustrates the bottom of the second embodiment.
Figure 7:
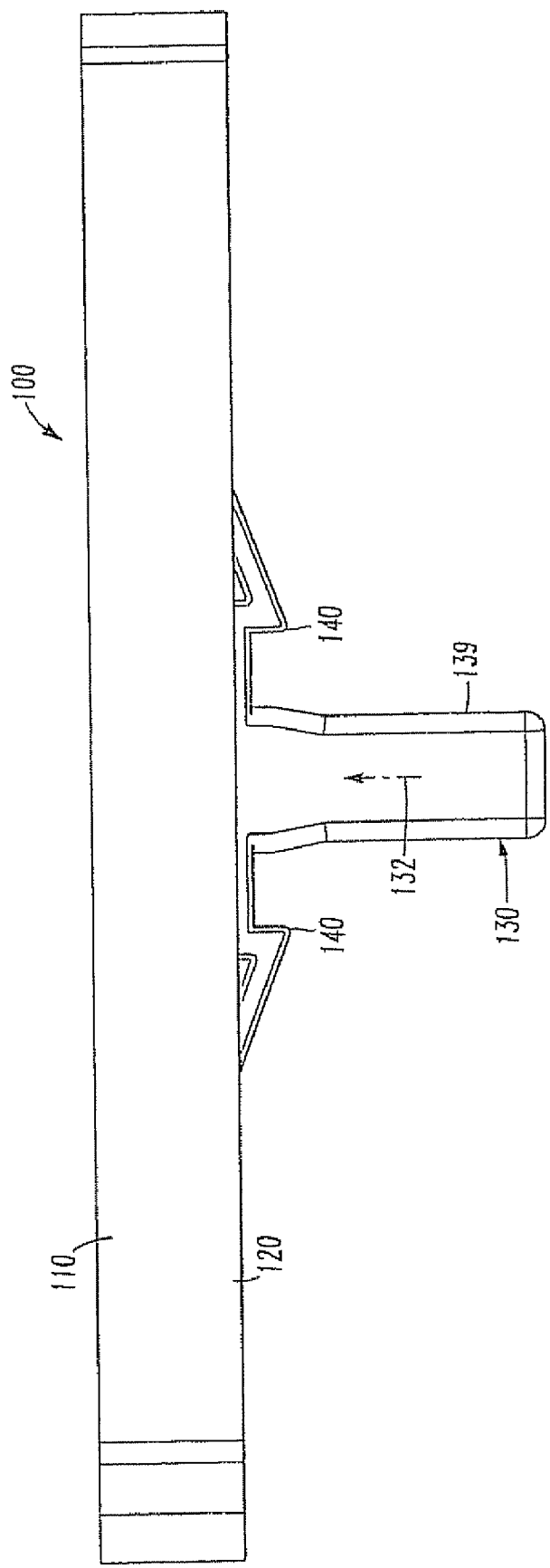
FIG. 7 is a side view of the second embodiment.
Figure 22:
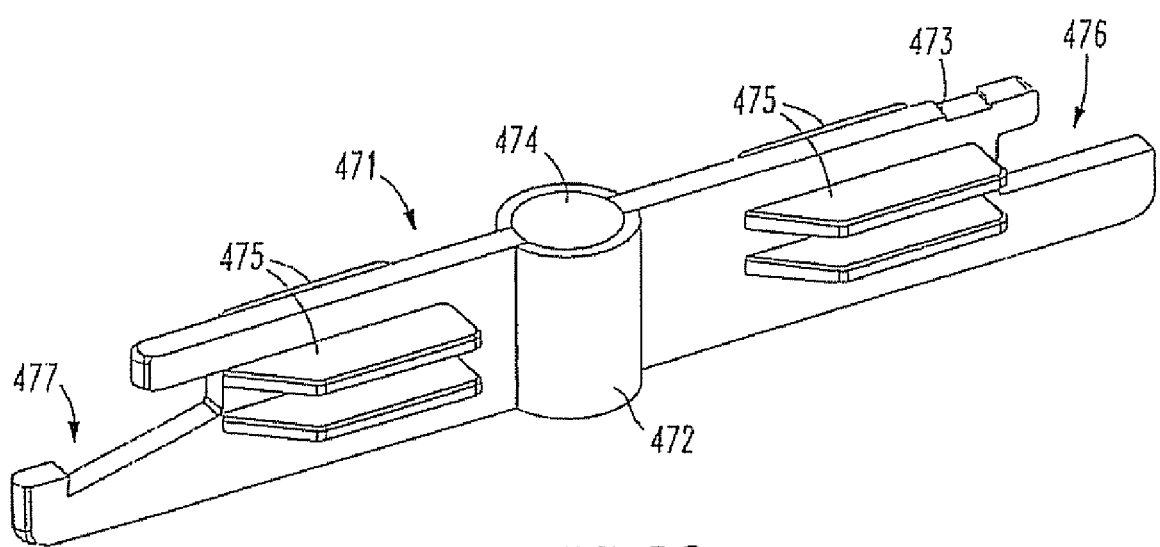
FIG. 22 is a perspective view of a first embodiment of a rail connector that can be used in a ninth present preferred embodiment of the present invention

In some embodiments, a rail connector 471 can be disposed between two adjacent rails 200 to connect the rails 200. As shown in FIG. 22, the rail connector 471 can have a first end 477 attached to a middle portion 472 and a second end 476 attached to the middle portion 472. The middle portion 472 has an aperture 474 sized to receive a bolt, screw, or other fastener. A fastener that extends through the aperture 474 can connect the rail connector to the underside of a work surface or to some other component of furniture The rail connector has flanges 475 that are spaced apart sufficiently to receive a portion of a rail 200 and support or hold that portion of the rail. In some embodiments, at least one of the ends 476, 477 may be moveable relative to the middle portion 474. In other embodiments, the entire rail connector is not moveable. In some embodiments the rail connector can be formed as a unitary structure Connectors that may be inserted into slot 230 can be designed in a variety of configurations. One embodiment of the present invention includes a connector 100 that has two prongs 140 and a release mechanism 130, as shown in FIGS. 5, 6 and 7. Such a connector can be used for connecting work surfaces adjacent to each other or for connecting two other types of components of furniture together. The connector 100 has a flame 110, which may be composed of metal, plastic wood, or a combination thereof, that is connected to insert 120. Insert 120 is more clearly shown in FIGS. 8 and 9. The insert is preferably made of plastic, elastic metal or another type of resilient material. In some embodiments of the present invention, the insert and frame can be formed as a unitary structure.

Figure 8:
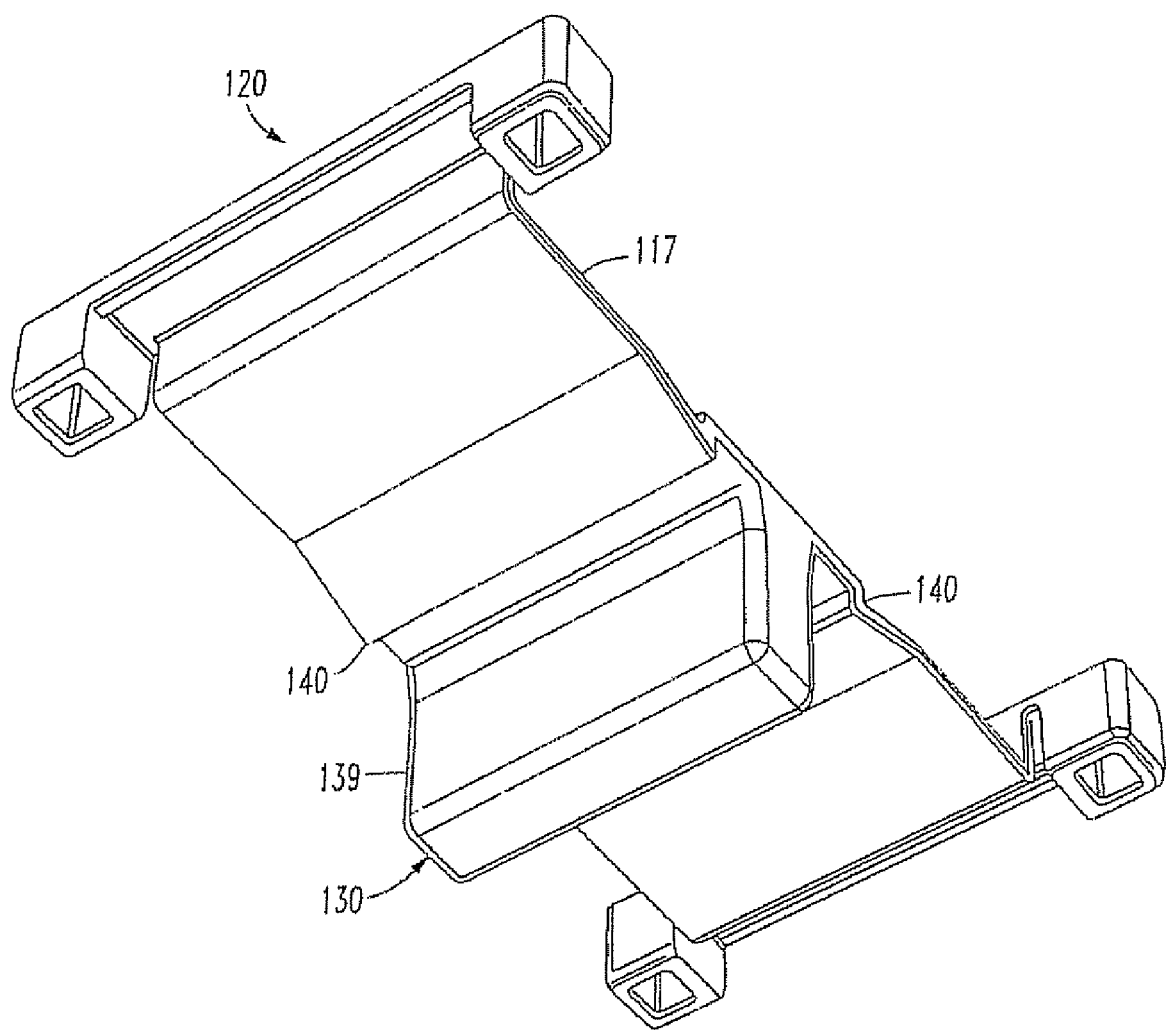
FIG. 8 is a perspective view of the insert portion of the second embodiment that illustrates the bottom of the insert.
Figure 9:
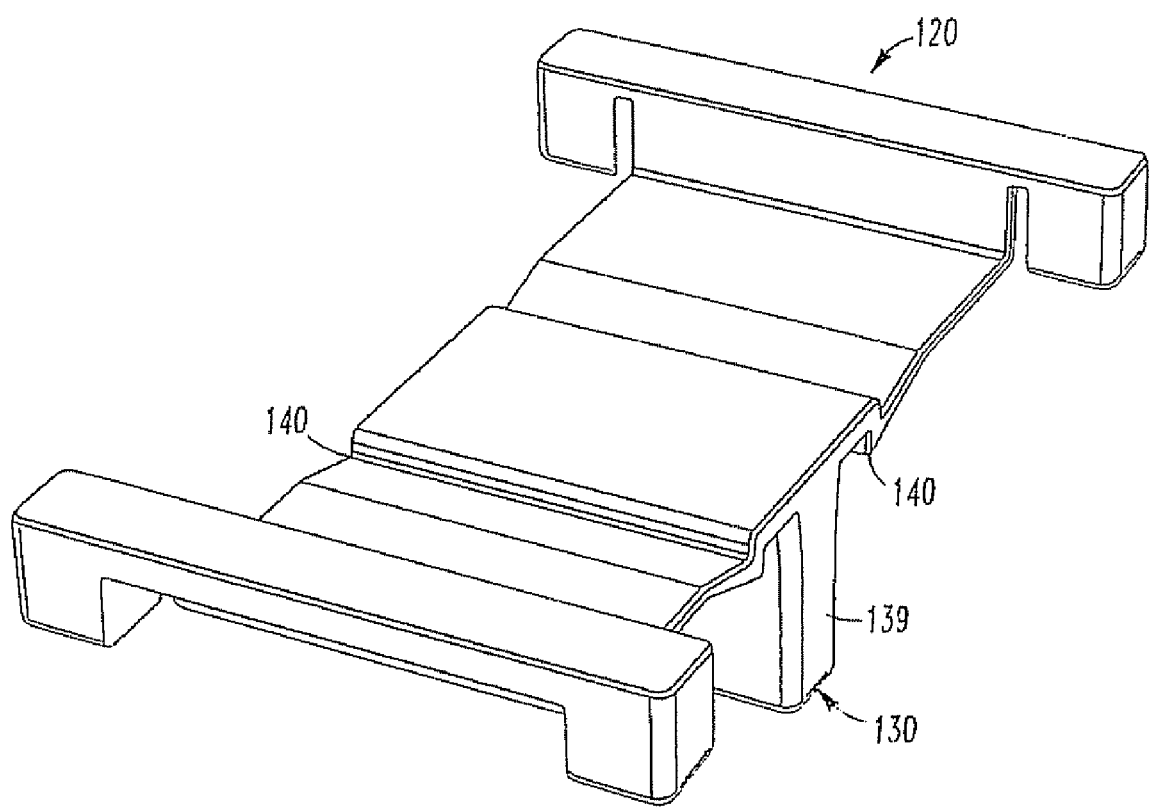
FIG. 9 is a perspective view of the insert portion of the second embodiment that illustrates the top of the insert.

As best seen in FIGS. 7, 8 and 9, insert 120 has a release mechanism 130 and prongs 140 attached to the body 117 of the insert Each prong 140 is attached adjacent different sides of the release mechanism 130. When connector 100 is inserted into slot 230, prongs 140 snap into recess 206, best shown in FIG. 1A or FIG. 17. The prong 140 remains within recess 206 until released by actuating release mechanism 130. Release mechanism 130 is actuated by pressing protrusion 139 toward the top of connector 100, in the direction indicated by arrow 132. The force applied to the protrusion 139 causes the insert to move away from the recess, releasing the prong 140 from the recess 206.

It should be appreciated that other release mechanisms can be provided to move prongs 140 when the release mechanism is actuated. For example, a button, rotatable knob, slidable switch or other actuator could be attached to the body 117 of the insert so that actuation of the actuator causes the prongs to move. As another example, multiple protrusions could be attached to the body 117 so that movement of each protrusion moved a respective prong As yet another example, the body 117 could be configured so that pulling the protrusion in a direction opposite arrow 132 would cause the prongs to move such that the prongs could move away from recess 206.

While the prongs 140 and release mechanism 30 are shown extending from the body in the same direction, it is also possible to configure the protrusion and prongs so that the prongs extend from one side of the body 117 and the protrusion extends from a different side of the body.

Figure 10:
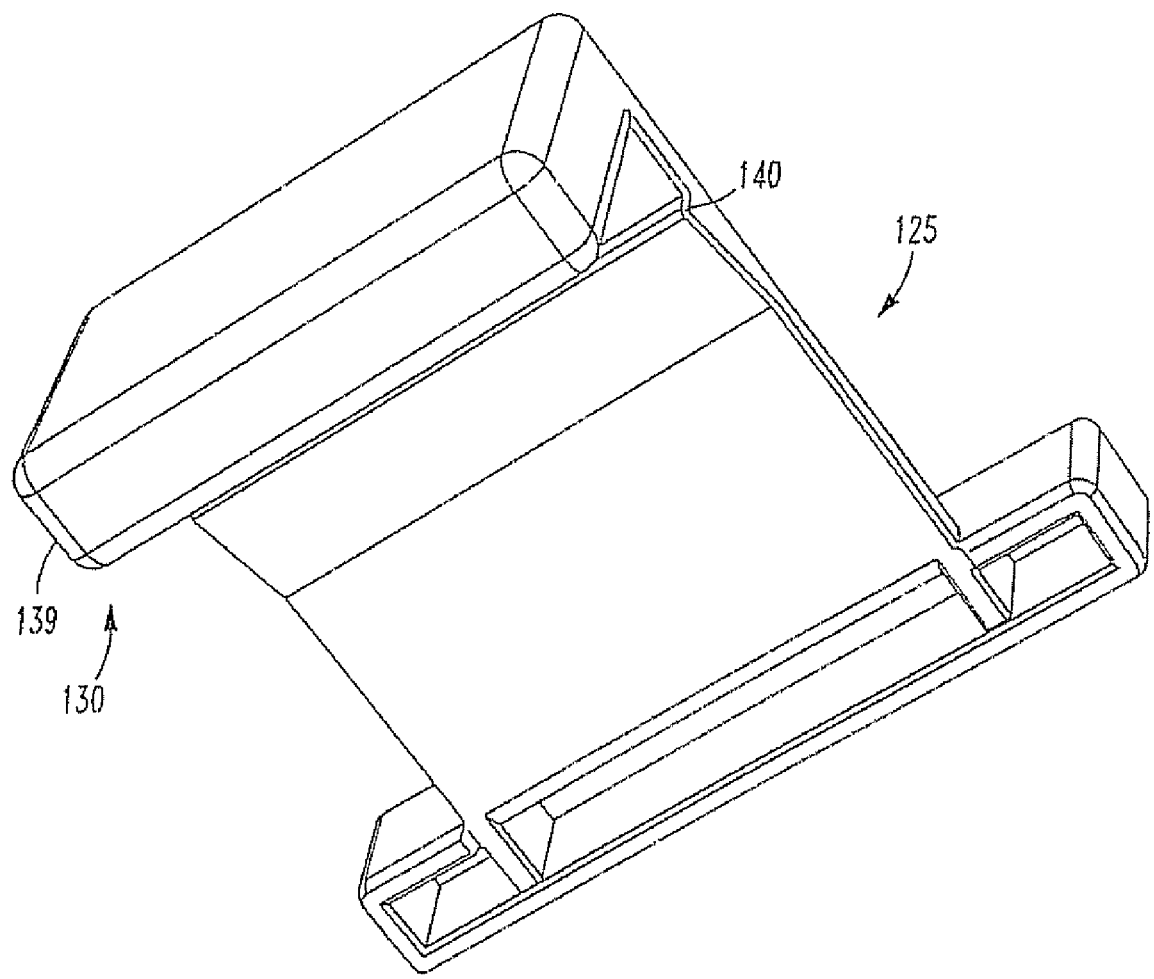
FIG. 10 is a perspective view of the second embodiment of an insert showing the bottom of the embodiment
Figure 11:
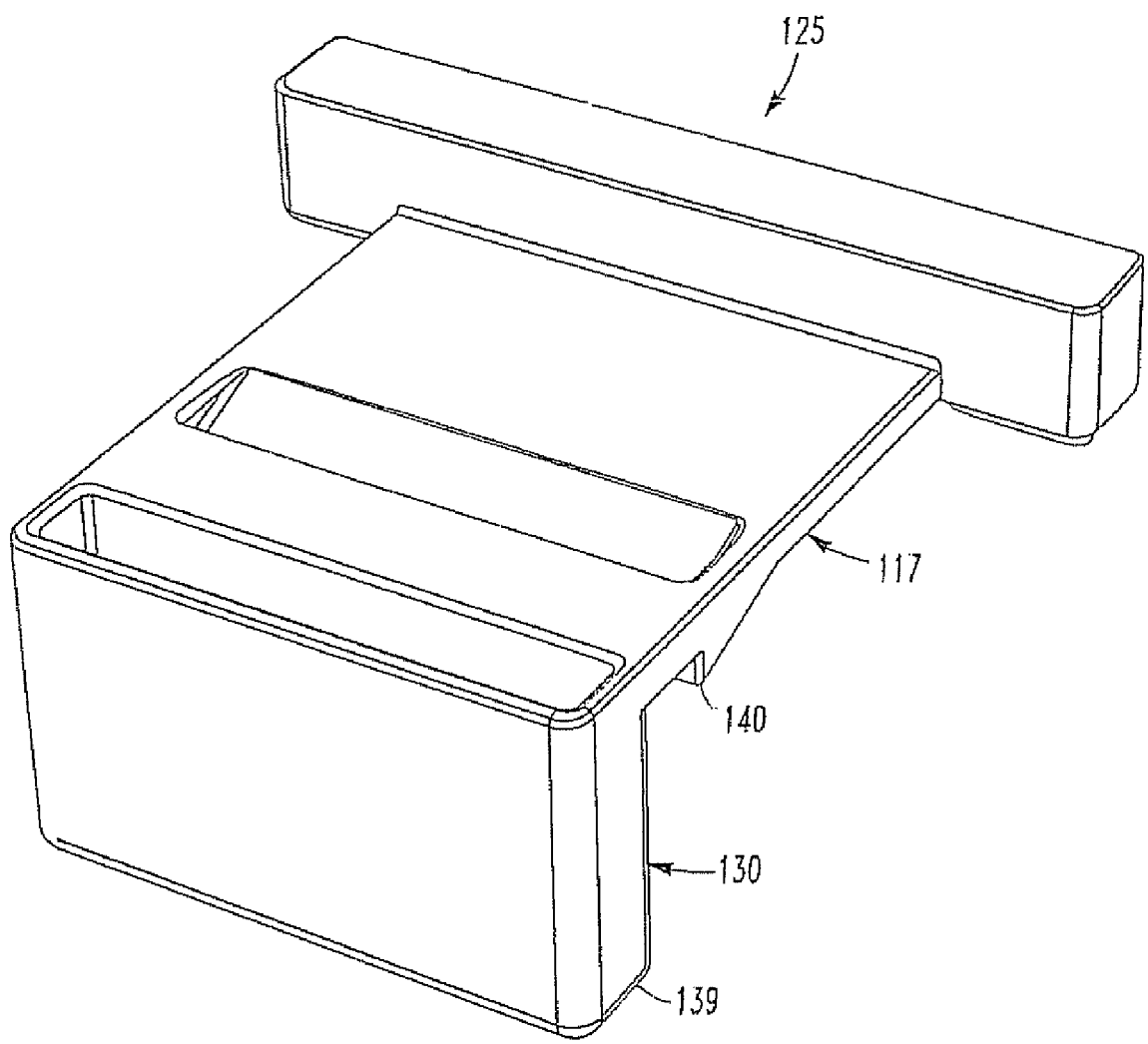
FIG. 11 is a perspective view of the second embodiment of the insert illustrating the top of the embodiment.
Figure 19:
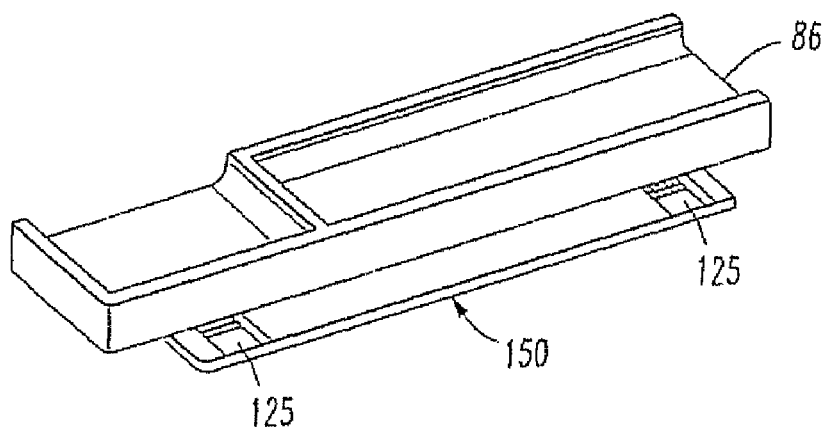
FIG. 19 is a perspective view of a first embodiment of a device having a body connected to two fasteners that can be used in connection with embodiments of the present invention.

FIGS. 10 and 11 show a one sided insert 125 that can be used to connect accessories such as wrist rests, pen trays, pencil trays, cable trays, other holders, panels, light partitions, storage devices or other apparatuses to the world surface 9 or other components of furniture For example, fastener 150 can have insert 125 connected to a pen tray 86, as shown in FIG. 19, so pen tray 86 can be connected to a work surface or other component of furniture.

Figure 12:
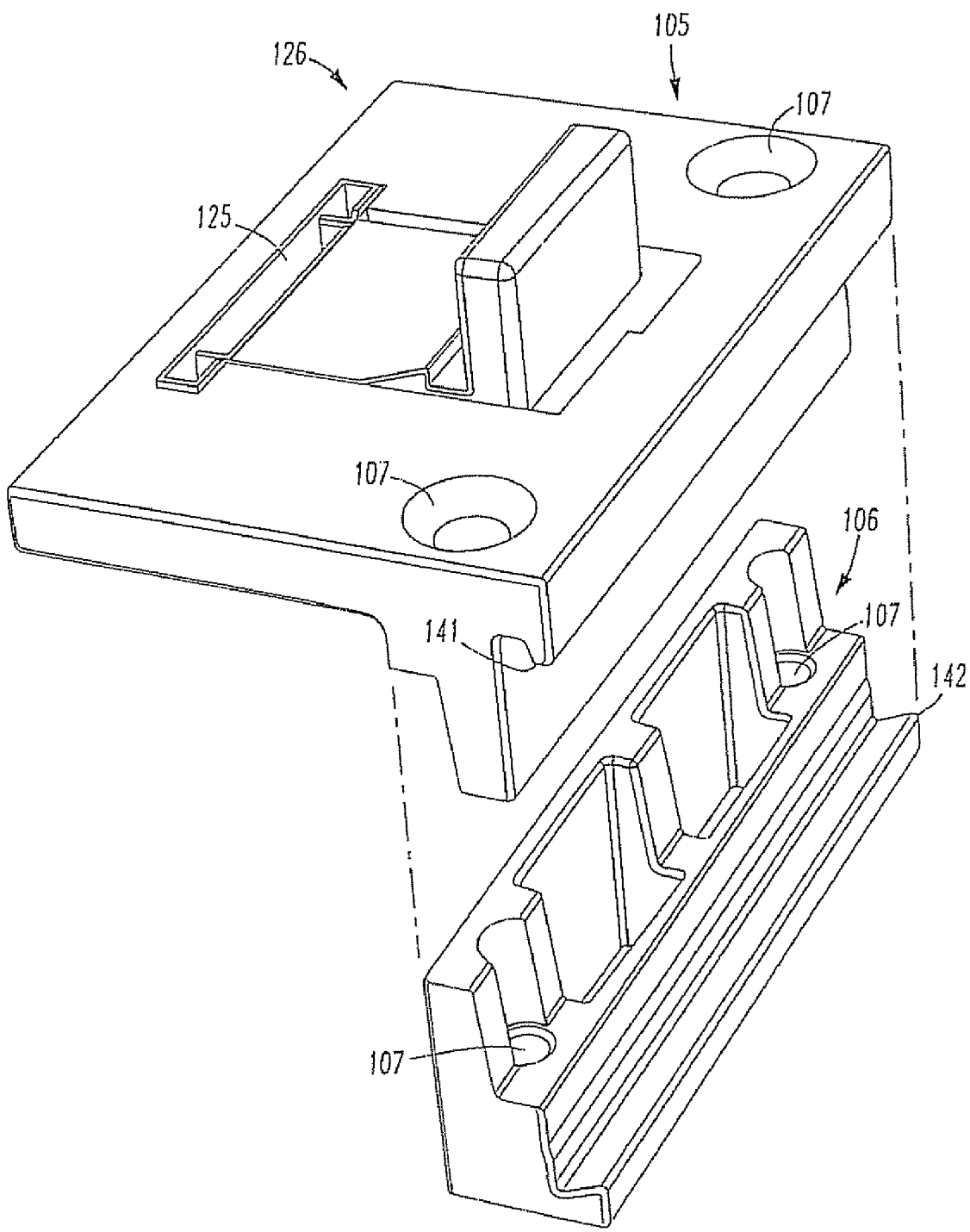
FIG. 12 is an exploded view of a third embodiment of the present invention.
Figure 13:
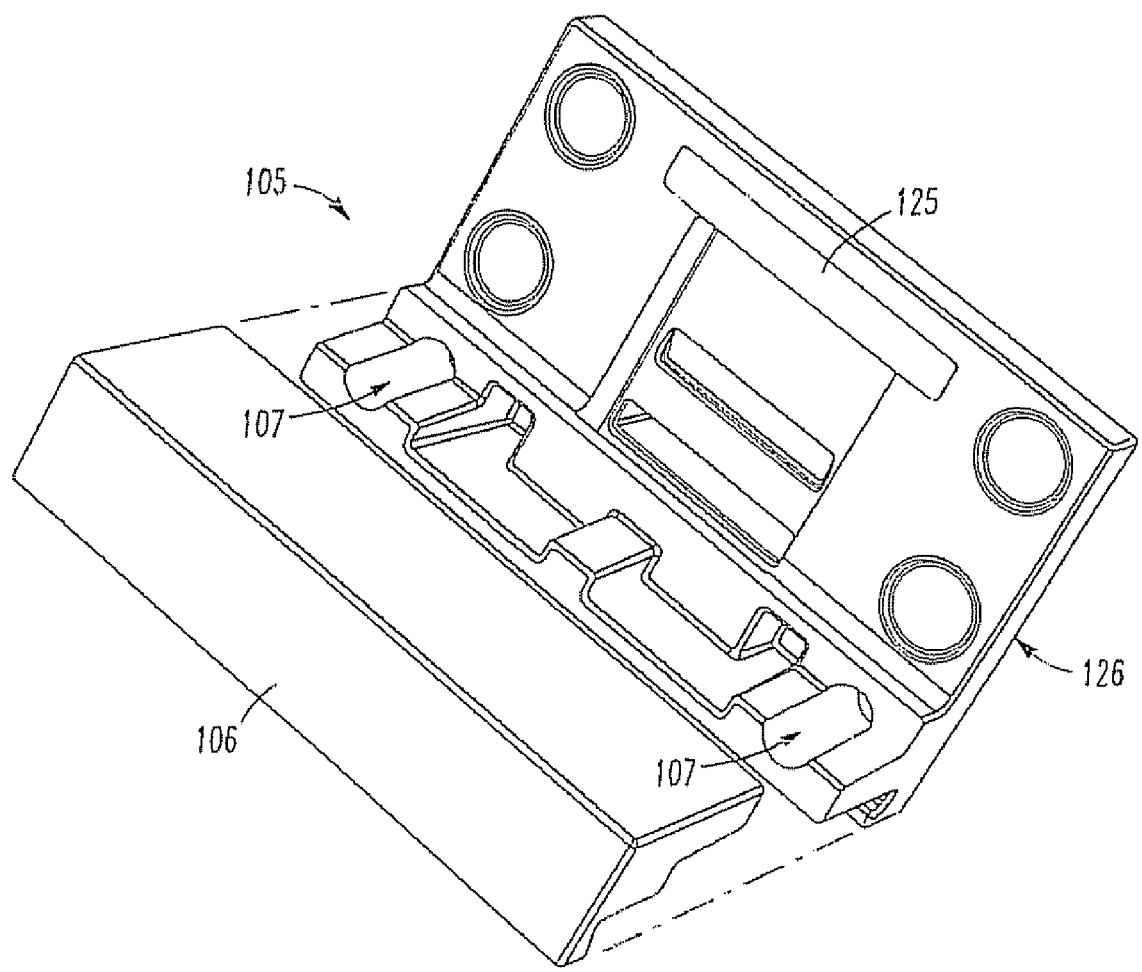
FIG. 13 is an exploded view of the third embodiment.
Figure 14:
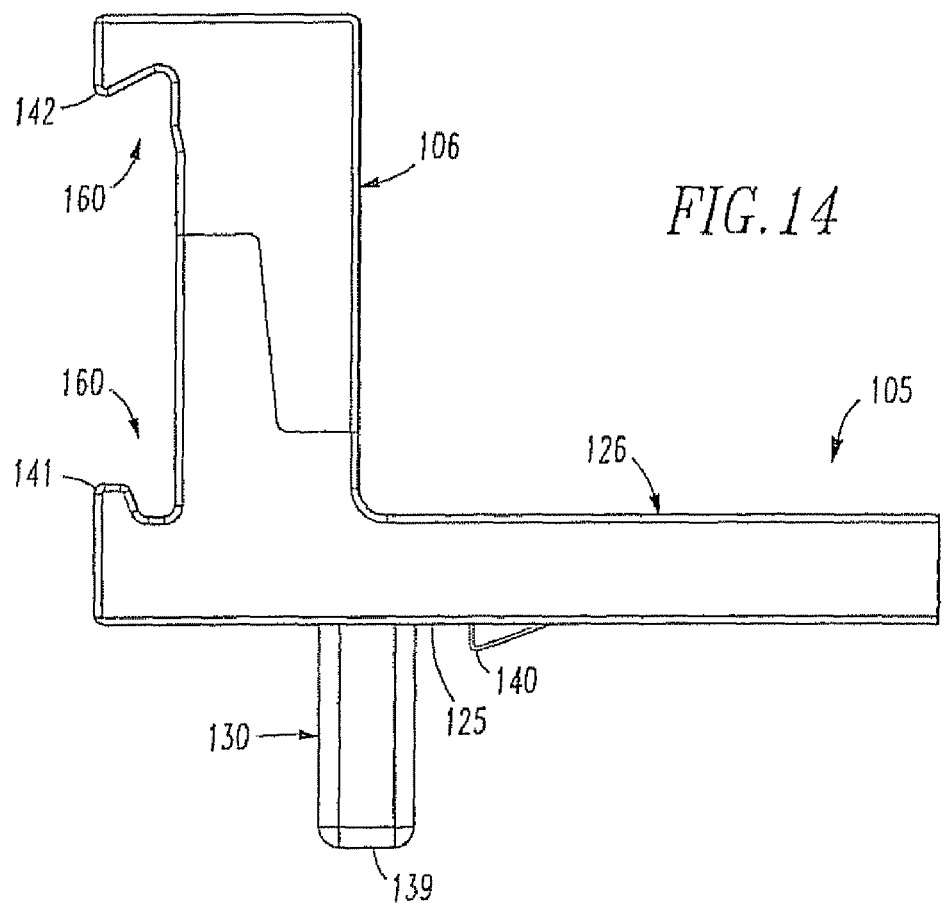
FIG. 14 is a side view of the third embodiment.

Another embodiment of our connector is shown in FIGS. 12, 13 and 14. Connector 105 has a first frame portion 126 connected to a second frame portion 106. Insert 125 is connected to frame portion 126. Projection 141 is attached to portion 126 and projection 142 is attached to portion 106. Projection 141 extends from portion 126 downward toward projection 142 and projection 142 extends upward from portion 106 toward projection 141 Such a configuration of projections 141 and 142 define jaws 160 that are sized and configured to receive and hold components of furniture such as storage devices and furniture accessories.

Figure 17:
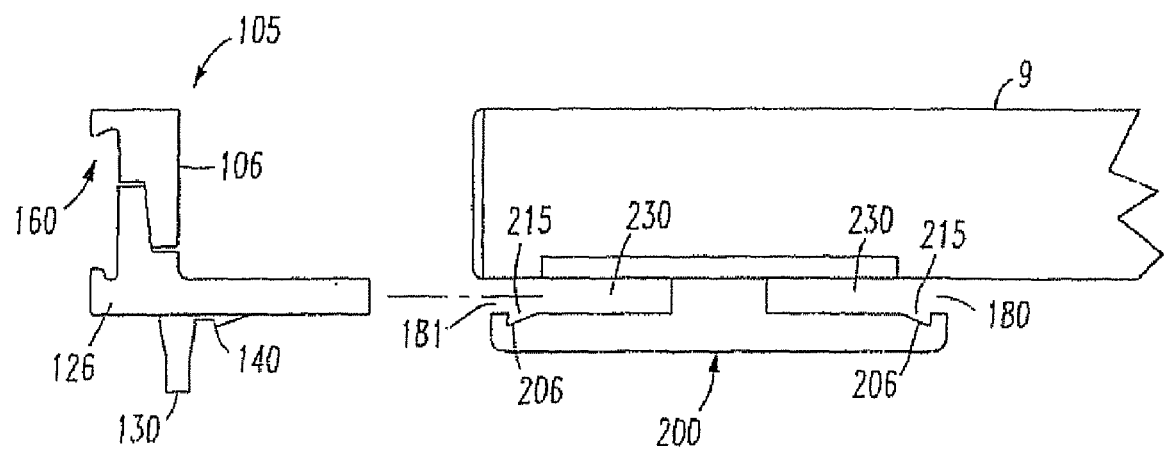
FIG. 17 is a fragmentary side view of a sixth embodiment of the present invention.
Figure 18:
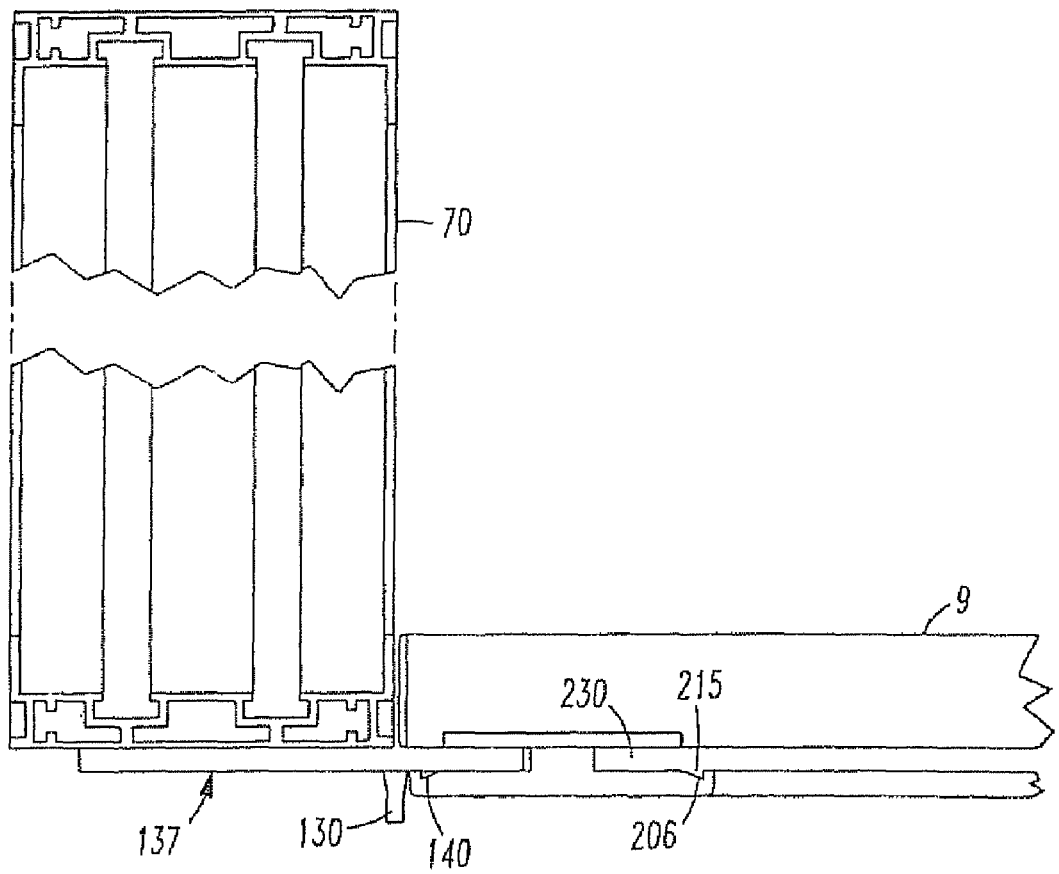
FIG. 18 is a fragmentary side view of a seventh embodiment of the present invention

For example, as shown in FIG. 17, connector 105 can be connected to a work surface or other component of furniture. Portion 126 can be inserted into slot 230 so that prong 140 of insert 125 fits within recess 206. Additional components or devices can then be held within jaws 160 of the connector 105.

Portion 106 and portion 126 can be connected by various different fasteners or be formed as one unitary structure. In one embodiment, bolts or other fastening devices can extend through apertures 107 in the connector to connect portion 126 with portion 106.

Figure 15:
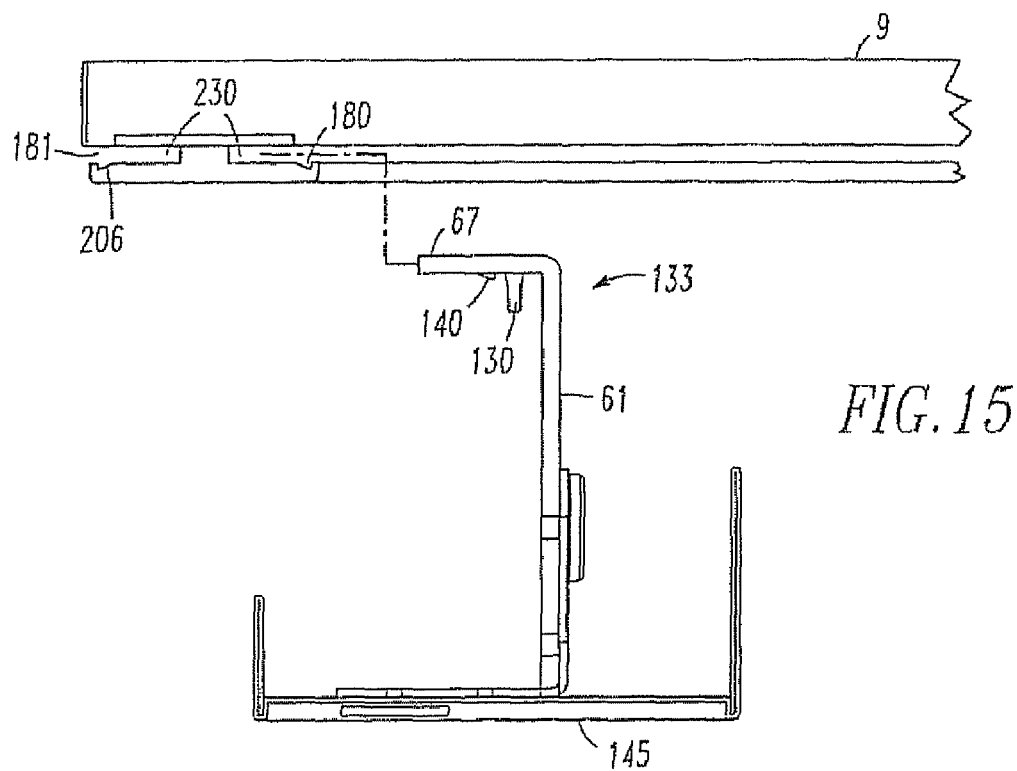
FIG. 15 is a sectional view similar to FIG. 1A of a fourth embodiment of the present invention.
Figure 16:
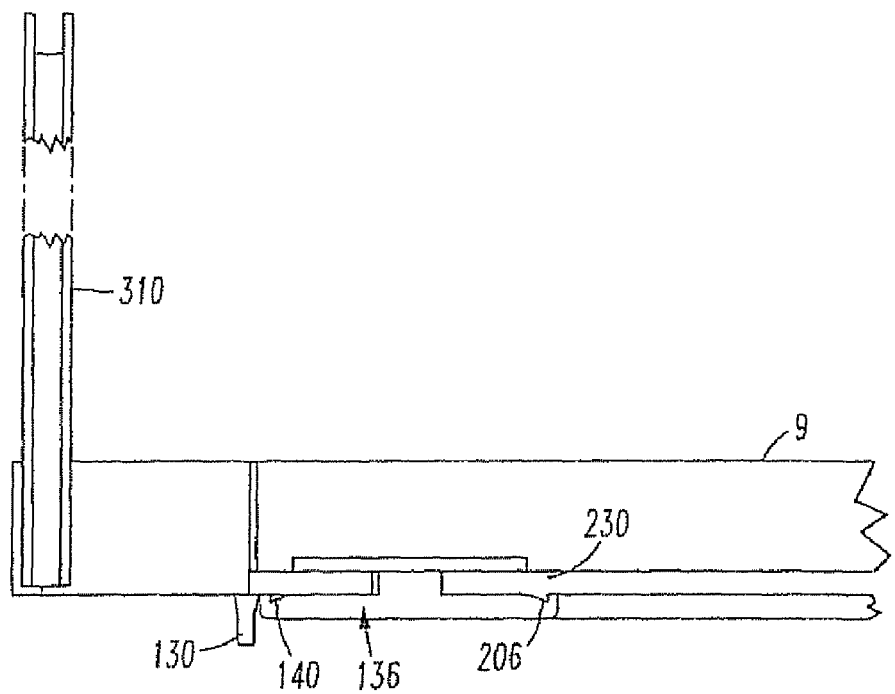
FIG. 16 is a sectional view similar to FIGS. 1A and 15 of a fifth embodiment of the present invention.

Referring to FIG. 15, another embodiment of the present invention can have connector 133 attached to cable tray 145. The connector 133 can have prong 140 and release mechanism 130 extend from the body of the connector. The body of the connector 133 can have a first portion 67 attached to a perpendicular second portion 61. The second portion 61 is attached to the cable tray 145. The cable tray 145 is sized and configured to retain cables that may be used in connection with equipment stored on the work surface 9 such as computers, servers, and other electronic devices or network devices. Of course, connector 133 can also be connected to other holders or storage devices.

A connector 136 can also be attached to a modesty panel 310 or other panel that can provide privacy to a work area. The connector 136 can be inserted into slot 230 until prong 140 is locked within recess 206. The connector can then hold the panel 310 adjacent the work surface 9. If a user desires to remove panel 310, the user may separate the panel from the work surface 9 by pulling on release mechanism 130. Pulling on release mechanism 130 causes prong 140 to move away from recess 206 so the connector 136 can be moved in a direction transverse and away from slot 230.

A technical panel 70, or storage device, sized and configured to hold wires, books or other devices can be connected to a connector 137. Connector 137 can be connected and separated from the work surface 9 similarly to connector 136.

It should be appreciated that the connectors may be slid along the slot 230 if the recesses 206 are sized and configured to extend along the entire slot 230. Because the connectors can slide along the slot 230, the components of furniture attached to the connector can be easily maneuvered or adjusted to meet changing office or room configurations or other work space needs. Of course, the recesses 206 can be positioned such that a plurality of recesses is defined in the rail 200 adjacent each slot 230. The size and configuration of such recesses can prevent connectors from movement along the slot or limit their movement along the slot.

Figure 20:
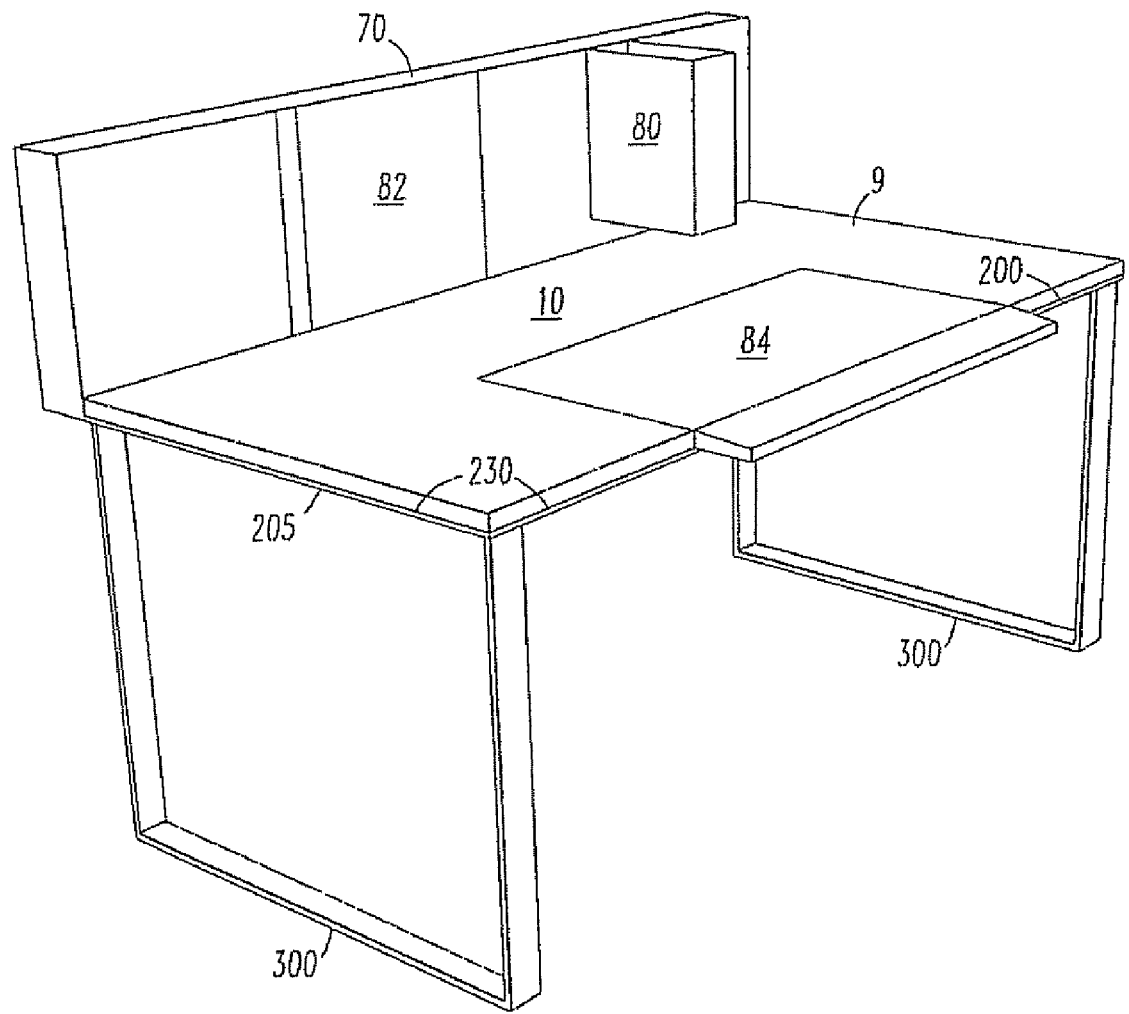
FIG. 20 is a perspective view of a seventh embodiment of the present invention.
Figure 21:
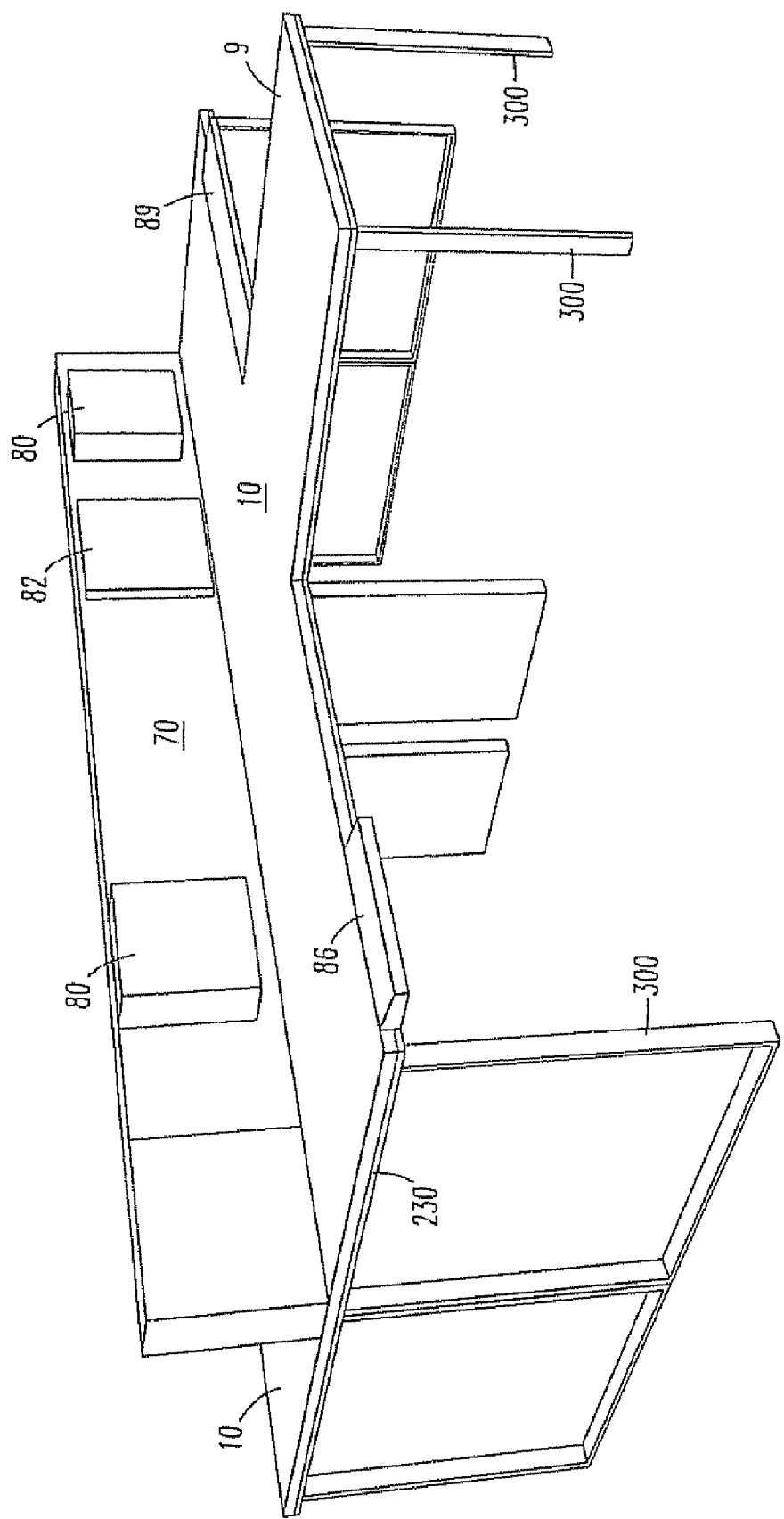
FIG. 21 is a perspective view of an eighth embodiment of the present invention.

Various combinations of connectors, furniture components and furniture accessories can be combined to form various other articles of furniture. For example, one embodiment of the present invention can include a desk or office work station, as shown in FIG. 20. The table 10 is connected to a technical panel 70 by one or more connectors. The technical panel is configured with a slot that is configured to receive a hook or connector 133 attached to a paper container 80. A bulletin board 82 may also be connected to the technical panel 70. One or more fasteners or connectors connect a blotter 84 to the work surface 9 of the table. The blotter 84 may be slidable along the slot 230 formed along the perimeter of the table.

Another embodiment of the present invention can include large work stations formed from multiple tables 10 connected together by connectors 100. Tech panels 70 are connected to the tables 10 by connectors 137. Pen tray 86 and wrist rest 89 are also connected to different tables 10. The pen holders 86 and paper containers 80 are preferably configured to hold pencils, paper clips, papers or other tools that may be used by personnel working at or near the work station.

While we have shown and described certain present preferred embodiments of the present invention and have illustrated certain present preferred methods of making and assembling the same, it is to be distinctly understood that the invention is not limited thereto but may be otherwise variously embodied and practiced within the scope of the following claims.

What is claimed is:

1. A connector comprising:
   a frame;
   an insert connected to the frame, the insert comprising a body, at least one prong attached to the body, and at least one release mechanism attached to the body, the at least one prong sized and configured to fit within a recess in at least one component of furniture;
   wherein the at least one release mechanism and the at least one prong are attached to the body such that actuation of the at least one release mechanism causes the at least one prong to move; and
   wherein the frame is further comprised of a first portion attached to a second portion, a first projection attached to the first portion adjacent the insert, and a second projection attached to the second portion, the second projection extending from the frame toward the first projection, the first projection extending from the frame toward the second projection, the first and second projections being sized and configured to releasably retain a component of furniture between the first and second projections.

2. The connector of claim 1 wherein the frame and the insert are a unitary structure.

3. The connector of claim 1 wherein the insert is comprised of a resilient material selected from the group consisting of plastics, elastics and metals.

4. The connector of claim 1 wherein the at least one release mechanism is comprised of a first protrusion attached to the body such that movement of the first protrusion causes the at least one prong to move, the first protrusion being actuated by a force applied to the first protrusion.

5. The connector of claim 4 wherein the first protrusion has a first side and a second side opposite the first side and wherein the at least one prong is comprised of a first prong and a second prong, the first prong attached to the body adjacent the first side of the first protrusion and the second prong attached to the body adjacent the second side of the first protrusion.

6. The connector of claim 1 wherein at least one of the frame and the insert is further comprised of at least one aperture.

7. The connector of claim 1 wherein the second portion of the frame is perpendicular to the first portion of the frame.

8. The connector of claim 1 wherein the body has a top and a bottom and the at least one release mechanism and the at least one prong extend from one of the bottom of the body and the top of the body.

9. The connector of claim 1 wherein the body is further comprised of a first portion and a second portion that is substantially perpendicular to the first portion.

10. The connector of claim 9 further comprising an element attached to the second portion of the body, the element comprising a base portion and at least one portion extending from the base portion, the base portion of the element being substantially perpendicular to the second portion of the body.

11. A modular furniture system comprising:
    at least one component of furniture, the at least one component of furniture having at least one slot and at least one recess adjacent the slot;
    at least one connector comprising a body, a release mechanism attached to the body, and at least one prong attached to the body, the at least one prong sized and configured to fit within the at least one recess in the at least one component of furniture, the at least one release mechanism attached to the body such that actuation of the at least one release mechanism causes the at least one prong to move;
    wherein the at least one prong is positionable within the at least one recess to releasably connect the at least one connector to the at least one component of furniture and wherein actuation of the at least one release mechanism causes the at least one prong to move away from the at least one recess such that the at least one connector is separable from the at least one component of furniture; and
    wherein the at least one component of furniture is comprised of at least one rail attached to a structure such that the at least one slot is formed between the structure and the at least one rail, the at least one rail having at least one groove that defines the at least one recess adjacent the at least one slot.

12. The system of claim 11 wherein the at least one component of furniture is at least one component selected from the group consisting of light panels, tables, desks, storage devices, technical panels, pen holders, work surfaces and cable trays.

13. The system of claim 11 wherein the at least one rail is comprised of a material selected from the group consisting of metals, wood and plastics.

14. The system of claim 11 wherein the at least one rail is comprised of a first rail and a second rail and the at least one component of furniture is further comprised of a rail connector positioned between the first and second rails, the rail connector having a first end and second end, the first end of the rail connector attached to the first rail, the second end of the rail connector attached to the second rail.

15. The system of claim 11 wherein the structure has a perimeter and the at least one rail is attached to the structure adjacent the perimeter of the structure.

16. The system of claim 11 wherein the at least one rail has an interior side and an exterior side, the at least one slot is comprised of a first slot and a second slot, the first slot being defined between the interior side of the at least one rail and the structure, the second slot being defined between the exterior side of the at least one rail and the structure, and wherein the at least one groove is comprised of a first groove adjacent the first slot and a second groove adjacent the second slot.

17. The system of claim 11 wherein the at least one connector is a plurality of connectors and the at least one component of furniture is a plurality of components of furniture.

18. The system of claim 11 wherein the at least one component of furniture is comprised of a plurality of components of furniture, the system further comprising an article of furniture comprised of the plurality of components of furniture and the at least one connector, the at least one connector connecting the plurality of components together.

19. The system of claim 11 further comprising at least one device configured to be connected to the at least one component of furniture, the at least one device being comprised of a body attached to at least one fastener, the at least one fastener having at least one release mechanism and at least one prong, the at least one prong of the at least one fastener sized and configured to fit within the at least one recess in the at least one component of furniture, the at least one release mechanism of the at least one fastener attached to the body of the at least one fastener such that actuation of the at least one release mechanism of the at least one fastener causes the at least one prong of the at least one fastener to move.

20. The system of claim 19 wherein the at least one device is at least one apparatus selected from the group consisting of panels, holders, storage devices, and cable trays.

21. The system of claim 11 wherein at least one connector is comprised of a first connector, wherein the at least one release mechanism of the first connector is comprised of a first protrusion attached to the body such that movement of the first protrusion causes the at least one prong to move, the first protrusion being actuated by a force applied to the first protrusion.

22. The system of claim 21 wherein the first protrusion has a first side and a second side opposite the first side and wherein the at least one prong is comprised of a first prong and a second prong, the first prong attached to the body adjacent the first side of the first protrusion and the second prong attached to the body adjacent the second side of the first protrusion.

23. The system of claim 11 wherein the actuation of the at least one release mechanism causes the at least one prong to move away from the at least one recess in a direction that is transverse to the at least one recess such that the at least one prong can be removed from the at least one recess and the at least one slot by moving the at least one connector in a direction substantially transverse to the at least one slot.

* * * * *